United States Patent
Lewis et al.

[11] Patent Number: 5,328,211
[45] Date of Patent: Jul. 12, 1994

[54] CRUSH TUBE FLUID CONNECTION

[75] Inventors: Russell G. Lewis, Manlius; Howard H. Fraser, Jr., Lafayette, both of N.Y.

[73] Assignee: Carrier Cororation, Syracuse, N.Y.

[21] Appl. No.: 974,542

[22] Filed: Nov. 12, 1992

[51] Int. Cl.$^5$ .............................................. F16L 55/00
[52] U.S. Cl. ................................. 285/23; 284/334.2; 284/334.4; 284/382; 284/917; 29/512
[58] Field of Search ............ 285/370, 397, 334.1, 285/334.2, 332.1, 382, 334.4, 917, 167, 23; 277/236; 29/512

[56] References Cited

U.S. PATENT DOCUMENTS

| 511,937 | 1/1894 | Decarie | 285/334.2 X |
|---|---|---|---|
| 1,359,142 | 11/1920 | Allison | 285/397 |
| 1,957,605 | 5/1934 | Lamont | 277/236 X |
| 2,949,787 | 8/1960 | Klingler | 285/370 X |
| 3,180,662 | 4/1965 | Parlasca et al. | 285/334.4 X |
| 3,240,501 | 3/1966 | Smith | 277/236 X |
| 3,520,544 | 7/1970 | Taylor | 277/236 X |
| 4,175,754 | 11/1979 | Wilhelm | 277/236 X |
| 4,407,482 | 10/1983 | Daghe et al. | 285/917 X |

FOREIGN PATENT DOCUMENTS

| 1466193 | 1/1967 | France | 285/334.2 |
|---|---|---|---|
| 482969 | 1/1970 | Switzerland | 285/371 |
| 744183 | 6/1980 | U.S.S.R. | 285/334.4 |
| 2045376 | 10/1980 | United Kingdom | 285/334.1 |

Primary Examiner—Dave W. Arola

[57] ABSTRACT

A crush tube is used to provide a fluid connection between a first and second member. The crush tube has two tubular portions with a spherical portion therebetween. The tubular portions are loosely received in nominally coaxial bores having entrance chamfers. The spherical portion is deformed into contact with the chamfers as well as between the members whereby the tube provides a sealed fluid path between the bores.

4 Claims, 1 Drawing Sheet

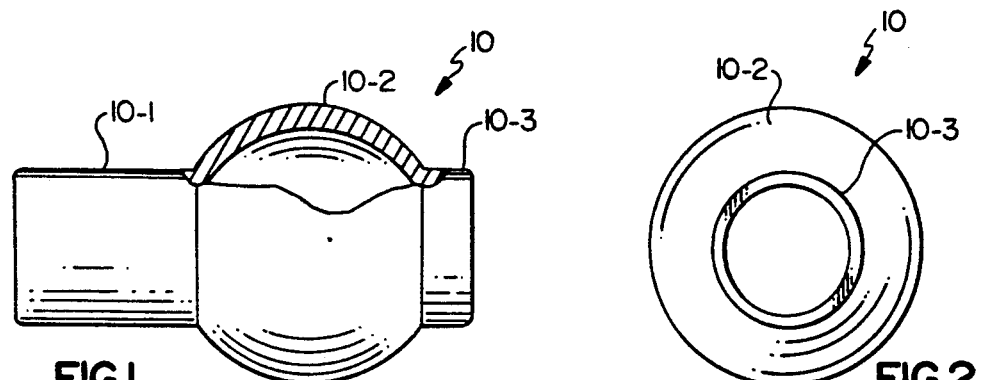
FIG.1   FIG.2
FIG.3
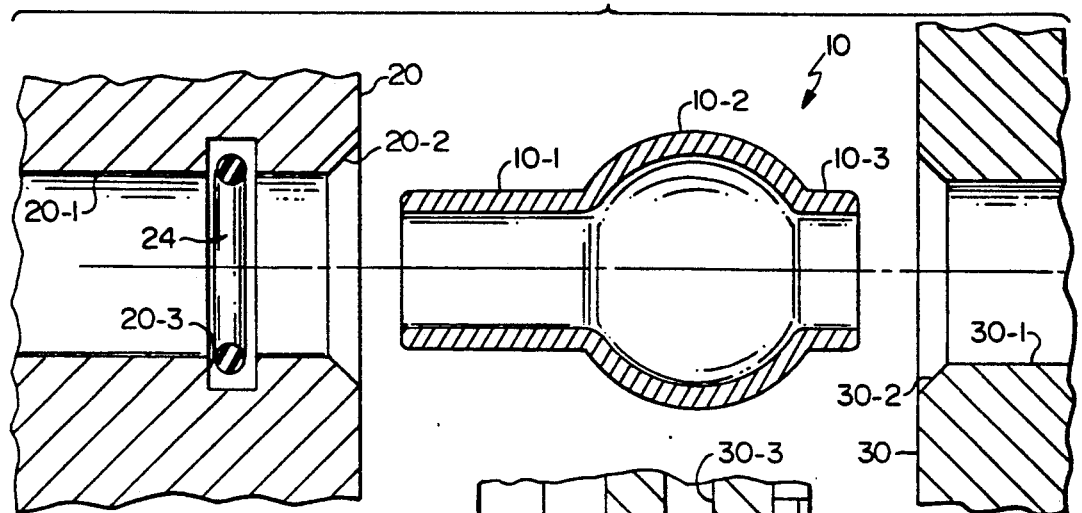
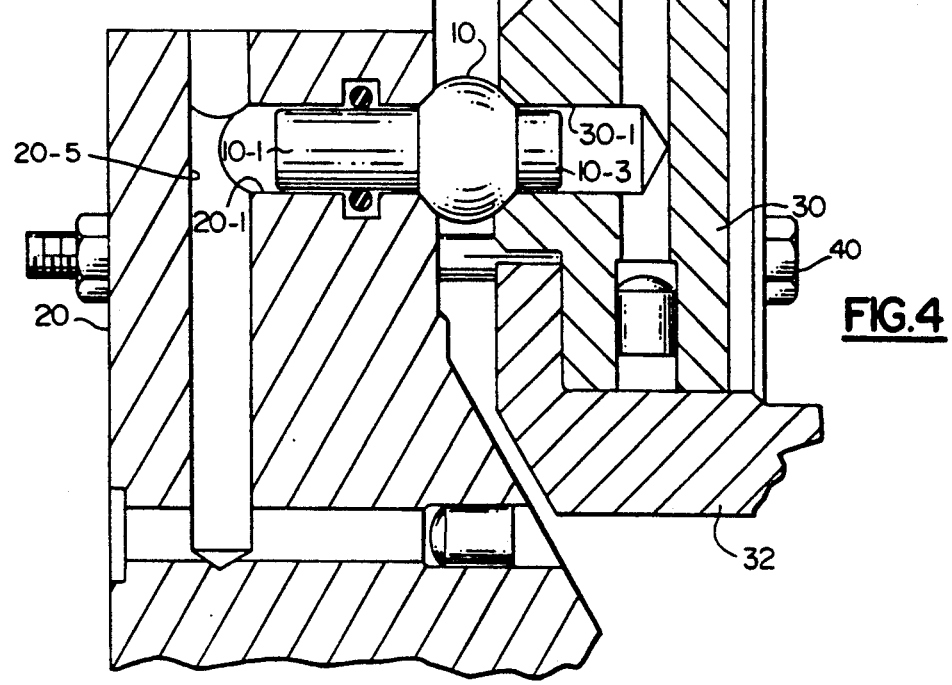
FIG.4

CRUSH TUBE FLUID CONNECTION

BACKGROUND OF THE INVENTION

Generally, mechanical parts require lubrication which, in turn, requires a lubrication distribution structure, often between parts and to separated structures. The pipes and tubing, as well as their fittings, complicate assembly, have space requirements increasing the dimensions of the device, and are vulnerable to damage during assembly and operation.

SUMMARY OF THE INVENTION

A thin walled metal tube has an expanded spherical portion along its length. The first end of the tube is placed in the bore of a first member having an O-ring therein and a lead in chamfer. The tube fits into the bore with clearance while the O-ring holds the tube for assembly. A second member has a bore therein and a lead in chamfer such that the second end of the tube is received in the bore of the second member with clearance. The first and second members are then drawn together, as by bolts, causing the spherical portion of the tube to seat on the respective chamfers. After initially causing the seating of the spherical portion on the two chamfers, further tightening causes the crushing or collapsing of the spherical portion thereby providing a fluid tight seating on the chamfers.

It is an object of this invention to provide a leak free fluid path between members.

It is another object of this invention to reduce spacing requirements between fluidly connected members.

It is a further object of this invention to provide a more reliable fluid connection.

It is an additional object of this invention to provide a method of fluidly connecting members that allows for some offset in the location of the respective bores being connected. These objects, and others as will be come apparent hereinafter, are accomplished by the present invention.

Basically, a thin walled metal tube has an expanded ball configuration along its length. The tube is placed between two members which each have a clearance hole or bore for receiving an end of the tube and a generous lead in chamfer. The ball configuration is sized such that it is crushed a minimum specified amount under all tolerance conditions as the two components are assembled. The tube diameter fits into the hole or bore in each component to locate the two parts in position. Preferably, one component contains an O-ring in a groove in the bore to hold the tube in position for assembly. The ball seats against the chamfer on each component, thus providing a seal. The amount of crush and the tube material properties determine the pressure which can be sealed against.

BRIEF DESCRIPTION OF THE DRAWINGS

For a fuller understanding of the present invention, reference should now be made to the following detailed description thereof taken in conjunction with the accompanying drawings wherein;

FIG. 1 is a partially cutaway side view of the crush tube of the present invention;

FIG. 2 is an end view of the crush tube;

FIG. 3 is an exploded sectional view of the assembly; and

FIG. 4 is a partial sectional view of an assembled device employing the present invention.

DESCRIPTION OF THE PREFERRED EMBODIMENT

In the Figures, the numeral 10 generally designates a crush tube which is a thin walled copper or steel tube having tubular ends 10-1 and 10-3 with spherical or ball portion 10-2 located therebetween. Referring now to FIG. 3, member 20 has a bore 20-1 with a generous lead in chamfer 20-2. Annular groove or recess 20-3 is formed in bore 20-1 and receives O-ring 24 therein. Member 30 has a bore 30-1 with a generous lead in chamfer 30-2.

Bore 20-1 receives tubular end 10-1 of crush tube 10 with a clearance while O-ring 24 receives tubular end 10-1 in some degree of an interference fit so as to hold end 10-1 in bore 20-1. As a result, crush tube 10 is initially capable of limited pivoting movement in bore 20-1 with O-ring 24 serving as the fulcrum. Because chamfer 20-2 is conical, ball portion 10-2 can seat thereon through the full angular movement of end 10-1 in bore 20-2. Seating at this time will be an annular line contact.

With end 10-1 being held in bore 20-2 by O-ring 24, member 20 and/or member 30 is moved so that the spacing therebetween is reduced and tubular end 10-3 enters bore 30-1. Because of its size and converging taper, chamfer 30-2 will serve to guide end 10-3 if engaged thereby. Bore 30-1 receives tubular end 10-3 of crush tube 10 with a clearance. Accordingly, crush tube 10 can be pivoted within O-ring 24 to accommodate coaxial deviation between bores 20-1 and 30-1. As the spacing between members 20 and 30 is reduced, due to tightening bolts or the like, spherical or ball portion 10-2 will eventually engage both chamfer 20-2 and 30-2 in an annular line contact independent of whether or not crush tube 10 is coaxial with bores 20-1 and 30-1. So, any reasonable misalignment between bores 20-1 and 30-1 is accommodated. Further tightening of the bolts causes the crushing or collapsing of spherical or ball portion 10-2 between chamfers 20-2 and 30-2. Spherical portion 10-2 will, in part, conform to chamfers 20-2 and 30-2 by deforming to frustums of a cone so that the annular line contact with chamfers 20-2 and 30-2 becomes area contact over the surface of the chamfers. Upon completion of assembly, as illustrated in FIG. 4, the spherical portion 10-2 will have been deformed in a columnar buckling action. The amount and kind of deformation will be influenced by the size and configuration of chamfers 20-2 and 30-2 as well as the size of the spherical portion 10-2. Upon assembly, members 20 and 30 are rigidly secured to member 32 which controls the spacing between members 20 and 30, limits the relative movement between members 20 and 30 and thereby the crushing of tube 10. A flow path now exists having a portion that serially includes bore 30-3, bore 30-1, tube 10, bore 20-1 and bore 20-5.

Although a preferred embodiment of the present invention has been illustrated and described, other changes will occur to those skilled in the art. It is therefore intended that the scope of the present invention is to be limited only by the scope of the appended claims.

We claim:

1. A fluid communication assembly comprising:
   a first member having a first bore with a chamfer defining an entrance to said first bore;
   a second member having a second bore with a chamfer defining an entrance to said second bore;

a thin walled metal crush tube having first and second tubular portions loosely received in said first and second bores when said first and second bores are nominally coaxial and with a hollow spherical portion therebetween, said hollow spherical portion initially engaging said chamfers in said first and second members in annular line contacts and subsequently deformed into fluid tight area engagement over the surface of said chamfers in said first and second members;

means fore relatively moving said first and second members whereby said fluid tight area engagement is obtained between said crush tube and said first and second members.

2. The assembly of claim 1 wherein:

said first member further includes an annular recess formed in said first bore;

means located in said annular recess and adapted to receive said first tubular portion in an interference fit while permitting limited angular movement of said crush tube prior to deformation of said crush tube between said first and second members.

3. A method of assembling members to provide fluid communication therebetween comprising the steps of:

placing a first tubular portion of a thin walled metal crush tube having a second tubular portion with a hollow spherical portion between said first and second tubular portions into a first bore in a first member having a chamfered entrance to said first bore;

relatively moving said first member and said tube and a second member having a second bore having a chamfered entrance to said second bore such that said second tubular portion enters said second bore;

continuing relatively moving said first and second members into proximity such that said chamfered entrances to said first and second bores initially engage said spherical portion in annular line contact and upon further movement deform said spherical portion into fluid tight sealing contact over the surface of said chamfers.

4. The method of claim 3 wherein said first and second bores receive said first and second tubular portions with a clearance and said first tubular portion is initially held in said first bore so as to have as much angular movement as is permitted by said clearance with said first bore.

* * * * *